United States Patent
Kang et al.

(10) Patent No.: US 7,945,282 B2
(45) Date of Patent: May 17, 2011

(54) PREAMBLE TRANSMISSION METHOD FOR WIRELESS COMMUNICATION SYSTEM

(75) Inventors: Min Seok Kang, Seoul (KR); Yong Noh Lee, Cheonan-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 518 days.

(21) Appl. No.: 12/080,059

(22) Filed: Mar. 31, 2008

(65) Prior Publication Data

US 2008/0259861 A1 Oct. 23, 2008

(30) Foreign Application Priority Data

Apr. 20, 2007 (KR) .......................... 10-2007-0038901

(51) Int. Cl.
*H04B 7/00* (2006.01)
*H04Q 7/20* (2006.01)

(52) U.S. Cl. ........ 455/522; 455/69; 455/452.2; 455/509

(58) Field of Classification Search .................. 455/450, 455/452.1, 522, 69, 452.2, 67.11, 517, 509, 455/464; 370/329
See application file for complete search history.

(56) References Cited

U.S. PATENT DOCUMENTS

| 2008/0049706 A1* | 2/2008 | Khandekar et al. ........... 370/342 |
| 2009/0247211 A1* | 10/2009 | Kuroda .......................... 455/522 |
| 2010/0105405 A1* | 4/2010 | Vujcic ......................... 455/452.1 |

FOREIGN PATENT DOCUMENTS

| KR | 2002-55085 | 7/2002 |
| KR | 2003-58171 | 7/2003 |
| KR | 10-0600775 | 7/2006 |
| KR | 2007-41235 | 4/2007 |

* cited by examiner

Primary Examiner — John Lee
(74) Attorney, Agent, or Firm — Cha & Reiter, LLC

(57) ABSTRACT

A preamble transmission method for a wireless communication system is provided for improving the probability of successful transmission and reducing unnecessary retransmission power consumption. The preamble transmission method of the present invention calculates an initial transmission power; transmits a preamble with the initial transmission power through a random access channel; if an acknowledgement is received in response to the preamble, starts transmission of data; and if no acknowledgement is received in response to the preamble—calculates a retransmission power, and retransmits the preamble with the retransmission power.

17 Claims, 3 Drawing Sheets

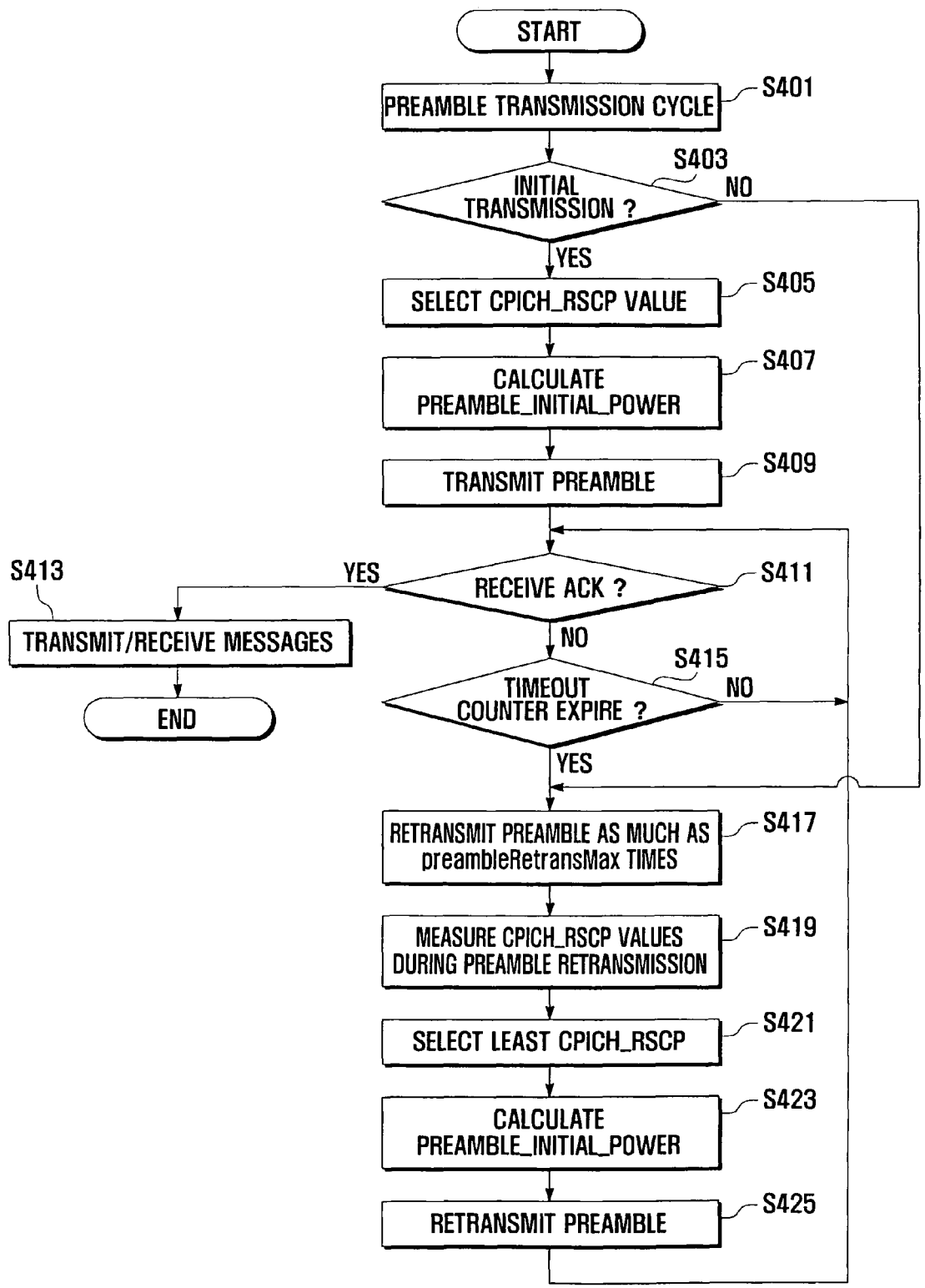

PREAMBLE TRANSMISSION METHOD FOR WIRELESS COMMUNICATION SYSTEM

CLAIMS OF PRIORITY

This application claims priority to an application entitled "PREAMBLE TRANSMISSION METHOD FOR WIRELESS COMMUNICATION SYSTEM," filed in the Korean Intellectual Property Office on Apr. 20, 2007 and assigned Serial No. 2007-0038901, the entire contents of which are incorporated herein by reference.

BACKGROUND OF THE INVENTION

1. Field of the Invention

The present invention relates to a mobile communication system and, in particular, to a preamble transmission method for a wireless communication system that is capable of increasing the probability of successful transmission.

2. Description of the Related Art

Typically, Wideband Code Division Multiple Access (WCDMA) systems, also known as Universal Mobile Telephone Systems (UMTS), utilize the Random Access Channel (RACH) and the Common Packet Channel (CPCH) as uplink transport channels.

FIG. 1 is a diagram illustrating a session initiation procedure in a conventional wireless communication system.

Referring to FIG. 1, in order for a user equipment 110 to place a call to a particular telephone number, the user equipment 110 sends a request for a connection to a base station 130 by means of an RACH preamble (S100). The RACH is an uplink transport channel employed by the user equipment 110 to connect to the base station 130. When an RACH preamble is received from the user equipment 110, the base station 130 sends an acknowledgement (ACK) message to the user equipment 110 through an Acquisition Indicator Channel (AICH) (S103). After receiving the Ack message, the user equipment 110 and base station 130 initiate an exchange of channel establishment messages (S105).

The RACH preamble is characterized by the use of open loop power control unlike other dedicated channels. As such, the user equipment 110 calculates an initial transmission power on the basis of a current channel environment and transmits a preamble with the initial transmission power. The RACH preamble initial transmission power is calculated using equation 1.

$$\text{Preamble\_Initial\_Power} = \text{Primary\_CPICH\_Tx\_Power} - \text{CPICH\_RSCP} + \text{UL\_Interference} + \text{Constant\_Value} \quad \text{Equation 1}$$

wherein Primary CPICH_Tx_Power is a transmission power of a Common Pilot Channel (CPICH), CPICH_RSCP is a received signal code power strength at the user equipment, and the UL_Interference is an uplink interference amount.

In equation 1, all values except for the CPICH_RSCP are obtained from a system information message transmitted by the base station 130. The CPICH_RSCP is measured at the user equipment 110.

The system information message is broadcast over the entire cell, i.e., the coverage area of the base station 130. The user equipment in the coverage area of the base station attempts connections to the base station. In other words, the user equipment 110 receives the system information broadcast by the base station 130 and transmits the RACH preamble on the basis of the received system information. The RACH-related information includes Primary_CPICH Tx_Power, UL_Interference, Constant_Value, a number of maximum preamble ramping cycle (Mmax), a maximum preamble retransmission cycle (Rmax), preamble power increment ($\Delta P_0$), $i^{th}$ preamble transmission power ($P_i$), and transmission power offset ($P_{offset}$).

After transmitting the preamble with the initial power calculated using equation 1, the user equipment 110 awaits the Ack which is transmitted by the base station 130 through the AICH. If the Ack is not received, the user equipment 110 retransmits the preamble with the transmission power increased by power ramp step (powerRampStep) until reaching the maximum number of preamble retransmission times (preambleRetransMax). The transmission power of $n^{th}$ preamble is calculated by equation 2.

$$P(n) = \text{Preamble\_initial\_Power} + \text{powerRampStep} * (n-1) \quad 0 \leq n \leq \text{preambleRetransMax} \quad \text{Equation 2}$$

If the preamble retransmission number reaches the preambleRetransMax, the user equipment 110 measures the CPICH_RSCP again and repeatedly retransmits the preamble on the basis of the measured CPICH_RSCP as many times as Mmax.

If no Ack is received even with the continuous retransmission, the user equipment 110 tries to transmit the preamble as many times as preableRetransMax×Mmax.

In a case of radio resource control (RRC) connection request, the preamble retransmission may occur as many times as N300. In this case, the user equipment 110 retransmits the preamble totally preambleRetransMax×Mmax× N300 times. The RRC is a sub-layer responsible for efficient radio resource assignment.

Such a preamble unreachable problem can be caused by inefficient cell planning and inaccurate open loop power control in the time-varying radio frequency environment.

In such manner, the transmission power increases whenever the preamble is retransmitted at the ramping cycle (powerRampStep).

However, this conventional power control mechanism has a drawback in that the power consumption increases whenever the preamble is retransmitted. Furthermore, in a case that the initial transmission power (Preamble_Initial_Power) is determined at a low level, the preamble transmission failure probability increases even with the stepwise power increment.

That is, the conventional preamble transmission method is disadvantageous in terms of power consumption and RACH procedure failure caused by frequent retransmission, resulting in degradation of service reliability.

SUMMARY OF THE INVENTION

The present invention provides a preamble transmission method for a wireless communication system that is capable of increasing the probability of successful preamble transmission.

The present invention also provides a preamble transmission method for a wireless communication system that is capable of reducing power consumption by reducing preamble retransmission times while increasing the probability of successful preamble transmission.

The present invention also provides a preamble transmission method for a wireless communication system that is capable of improving communication service reliability and of avoiding unnecessary retransmission power consumption by calculating accurate initial transmission power.

In accordance with an aspect of the present invention, a preamble transmission method for a wireless communication system includes calculating an initial transmission power;

transmitting a preamble with the calculated initial transmission power through a random access channel; if an acknowledgement is received in response to the preamble, starting transmission of data; if no acknowledgement is received in response to the preamble, performing the steps of: (1) calculating a retransmission power, and (2) transmitting the preamble with the calculated retransmission power.

In accordance with another aspect of the present invention, a preamble transmission method for a wireless communication system includes: at a user equipment, estimating a received signal strength of a common pilot channel; calculating a transmission power using the estimated received signal strength; transmitting a preamble to a network with the calculated transmission power; if no acknowledgement is received in response to the preamble, retransmitting the preamble as many as a pre-determined maximum number of retransmission times; recalculating the transmission power using one of at least one received signal strength measured while retransmitting the preamble; and retransmitting the preamble with the recalculated power.

In accordance with another aspect of the present invention, a preamble transmission method for a wireless communication system includes: measuring received signal strength of a common pilot channel transmitted by the network; calculating a transmission power of a preamble using the measured received signal strength and information on a random access channel transmitted by the network; estimating an optimal received signal strength for retransmission of the preamble; and determining a retransmission power of the preamble using the estimated optimal received signal strength and the information on the random access channel transmitted by the network.

BRIEF DESCRIPTION OF THE DRAWINGS

The above features and advantages of the present invention will be more apparent from the following detailed description in conjunction with the accompanying drawings, in which:

FIG. 4 is a flowchart illustrating a preamble transmission method according to an embodiment of the present invention.

DETAILED DESCRIPTION OF THE INVENTION

Figure 1:
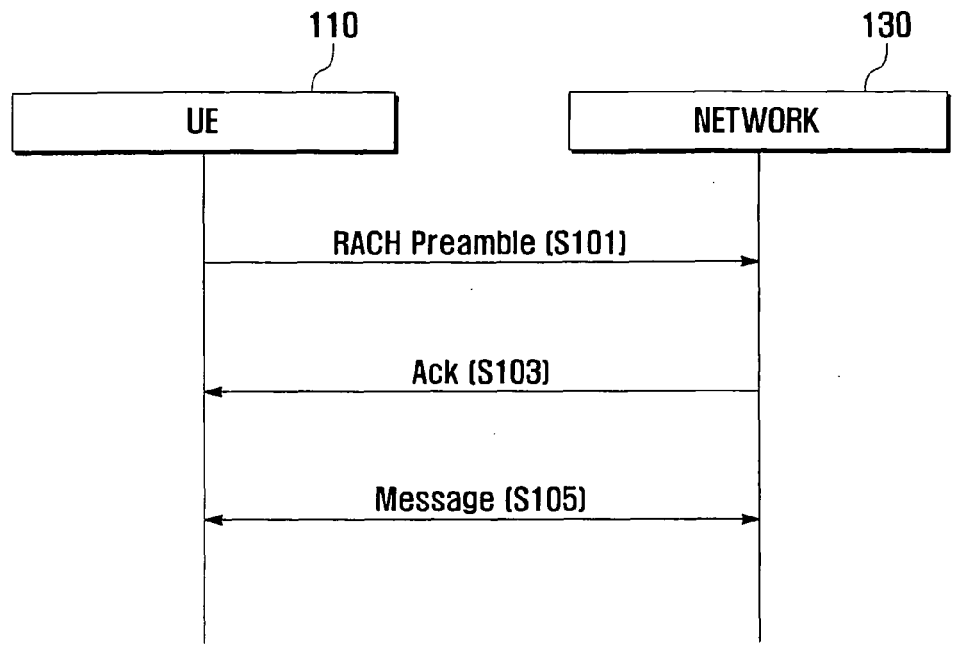
FIG. 1 is a diagram illustrating a session initiation procedure in a conventional wireless communication system.

Now, embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Certain terms are used in the following description for convenience and reference only and the invention is not limited to these terms. In the following detailed descriptions, only the embodiments of the invention have been shown and described, simply by way of illustration of the best mode contemplated by the inventors of carrying out the invention. As will be realized by those ordinarily skilled in the art, the invention is capable of modification in various obvious respects, all without departing from the spirit of the invention. Accordingly, the drawings and descriptions are to be regarded as illustrative in nature and not restrictive.

In the following descriptions, the preamble transmission method for wireless communication system according to the present invention is implemented so as to increase a probability of successful transmission of the RACH preamble with an efficient initial power control. For this purpose, the user equipment (UE) calculates an optimal initial transmission power for transmitting the RACH preamble and transmits the RACH preamble with the calculated optimal initial power, resulting in reduction of power consumption and improvement of service reliability.

In the following embodiments, the preamble transmission method enables calculating an optimal initial preamble power in a time-varying wireless environment, thereby reducing a number of retransmission times while increasing a probability of successful preamble transmission.

The wireless communication system represents one of or a combination of at least two of $2^{nd}$ generation (2G) systems such as Global System for Mobile Communications (GSM), 2.5G systems such as General Packet Radio System (GPRS), 3G systems such as Wideband Code Division Multiple Access (WCDMA), i.e. UMTS, and CDMA2000, and 4G and beyond-4G systems. In the following descriptions, the preamble transmission method is described with UMTS Terrestrial Radio Access Network (UTRAN) of the UMTS as an exemplary radio access network.

In the following descriptions, the term "user equipment (UE)" and "mobile terminal" are used interchangeably. The UE can be a dedicated communication terminal operating on the basis of wireless technologies such as Time Division Multiple Access (TDMA), GSM, GPRS, CDMA, and WCDMA, and wireless communication-enabled electric devices such as Portable Multimedia Player (PMP), MP3 player, digital broadcast receiver, Personal Digital Assistant (PDA), Smartphone, laptop computer, and personal computer.

In order to obtain an optimal initial preamble transmission power (Preamble_Initial_Power), a CPICH_RSCP value is determined in consideration of the time-varying RF environment. The CPICH_RSCP is the received power of the CPICH.

Typically, the CPICH_RSCP value may change in a range about 5~6 dB in a static status. Accordingly, in the case of using an instantaneous calculation of Preamble_Initial_Power, failure of the RACH preamble transmission frequently occurs in the time-varying environment.

Figure 2:
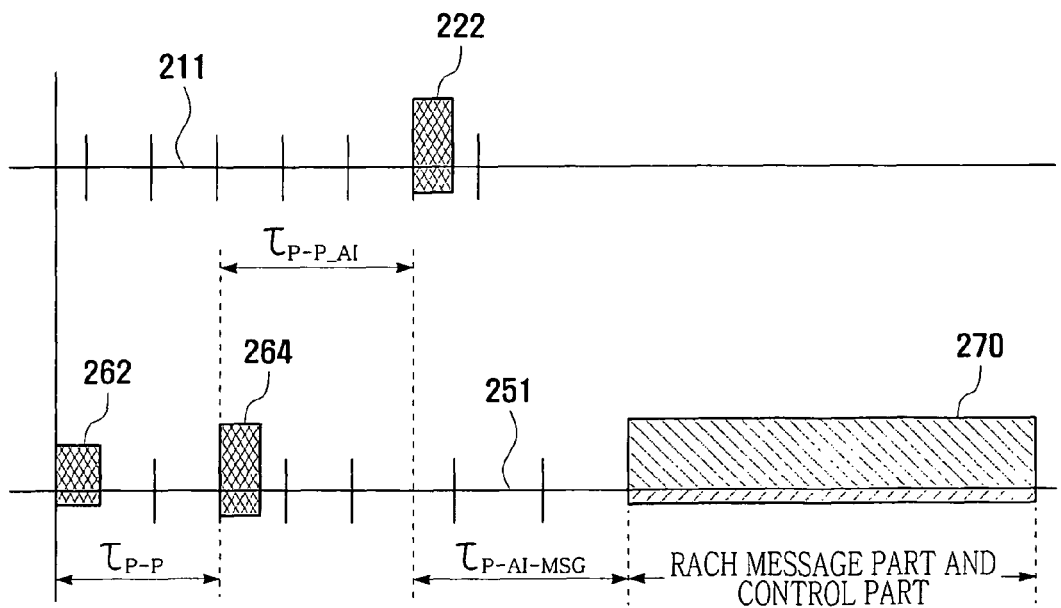
FIG. 2 is a conceptual view illustrating an RACH access procedure of a preamble transmission method according to an embodiment of the present invention.

FIG. 2 is a conceptual view illustrating an RACH access procedure of a preamble transmission method according to an embodiment of the present invention.

In FIG. 2, reference numeral 251 denotes a time line of the uplink RACH, and reference numeral 221 denotes a time line of the downlink Acquisition Indicator Channel (AICH) through which the UTRAN responds to the signal received through the RACH. The signal transmitted on the RACH is called a preamble, which is sent with a selected signature.

The RACH is a channel used by the UE to request allocation of a control channel for signaling during a call setup. The UE selects an access service class (ASC) according to a type of data to be transmitted and requests the channel using the RACH sub channel group (RACH sub_channel group) contained in the given ASC.

Referring to FIG. 2, the UE transmits a preamble 262 having a predetermined length through the RACH and waits for an acknowledgement (Ack) from the UTRAN. If no Ack is received within a predetermined time, the UE retransmits the preamble 264 with transmission power increased by one step. If the RACH preamble is detected, the UTRAN transmits an Ack to the UE through the AICH.

The UE checks the AICH so as to detect an Ack in response to the RACH preamble. If the Ack is received in response to the RACH preamble, the UE starts transmitting message through an uplink access channel.

If an Ack is not detected on the AICH in the predetermined time ($\tau_{P-A1}$) after transmitting the first preamble 262, the UE considers that the UTRAN did not receive the preamble and thus retransmits another preamble after a predetermined time. The preamble 264 is retransmitted with the power increased by $\Delta P(dB)$ relative to the first preamble 262. The signal used for generating the retransmission preamble is also one of the signals given in the ASC.

If no Ack is received in response to the retransmitted preamble, the UE repeats the retransmission while increasing the transmission power thereof in stepwise manner.

If an Ack is received in response to the transmitted preamble on the AICH, the UE transmits a message 270 to the UTRAN on uplink common channel after a predetermined amount of time. The message is spread by a scrambling code and encoded using a predetermined channelization code and then transmitted to the UTRAN with the uplink common channel initial power corresponding to the power used for transmitting the preamble with which an Ack is received.

As described above, in the case of preamble transmission failure, retransmission is repeated while increasing the transmission power thereof in a stepwise manner. As the number of preamble retransmission times increases, the power consumption increases.

Whenever the Preamble_Initial_Power is determined at a low level, the retransmission failure probability increases. Furthermore, in the worst case, the frequent RACH procedure failure makes it impossible to provide communication service. Particularly, in the time-varying wireless environment, limited battery power causes frequent preamble transmission failures.

In order to determine an optimal Preamble_Initial_Power, the preamble transmission method according to an embodiment of the present invention calculates the CPICH_RSCP value in consideration of the time-varying wireless environment. The Preamble_Initial_Power is calculated by equation 3.

$$\text{Peamble\_Initial\_Power} = \text{Primary\_CPICH\_Tx\_Power} - \text{CPICH\_RSCP} + \text{UL\_interference} + \text{Constant\_Value} \quad \text{Equation 3}$$

where the Primary CPICH_Tx_Power is a transmission power of a Common Pilot Channel (CPICH), the CPICH_RSCP is a received signal code power strength at the user equipment, and the UL_interference is an uplink interference amount.

In this embodiment, the UE stores the previously measured CPICH_RSCP values and uses the previous CPICH_RSCP values for calculating the Preamble_Initial_Power such that it is possible to obtain the Preamble_Initial_Power robust to the time-varying channels.

The operation of the UE employing the preamble transmission method according to an example of the present invention is described hereinafter in more detail.

The UE selects a value satisfying one of the following conditions as the CPICH_RSCP for determining the Preamble_Initial_Power.

(1) The least one of the n CPICH_RSCP values measured previously. (The UE compares the n CPICH_RSCP values measured currently and previously and then selects the least one among CPICH_RSCP values, where n is a natural number greater than 1.)

(2) A value compensated by reflecting variation of the channel environment. In this case, the UE reflects the previous values less than current value, as expressed in equation 4.

$$\text{CPICH\_RSCP} = \text{CPICH\_RSCP}_{CUR} - \text{compensation\_value} \quad \text{Equation 4}$$

where CPICH-RSCP$_{CUR}$ is the current CPICH_RSCP.

In equation 4, the compensation_value is calculated by equation 5.

$$\text{Compensation\_value} = \Sigma(a(k)\text{CPICH\_RSCP}_{CUR} - \text{CPICH\_RSCP}_k) \quad \text{Equation 5}$$

where CPICH_RSCP$_k$ is the currently measured CPICH_RSCP, $a(k) > a(k+1)$, and $a(k) = 0$ if CPICH_RSCP$_{CUR}$ > CPICH_RSCP$_k$.

In order to determine the next Preamble_Initial_Power, the UE measures the CPICH_RSCP values during the preamble transmissions of preambleRetransMax, selects the least CPICH_RSCP value, and applies the selected CPICH_RSCP to equation 3.

As described above, the UE can calculate the Preamble_Initial_Power reflecting the variation of the channel environment in a predetermined time. Since the Preamble_Initial_Power is calculated in consideration of the time-varying channel environment, the Preamble_Initial_Power is much more reliable such that the number of preamble retransmission times can be reduced. Reducing the number of preamble transmissions conserves the battery power of the UE and minimizes the probability of RACH procedure failure.

Operation of the UE employing the preamble transmission method, according to an embodiment of the present invention, is described hereinafter in more detail.

Figure 3:
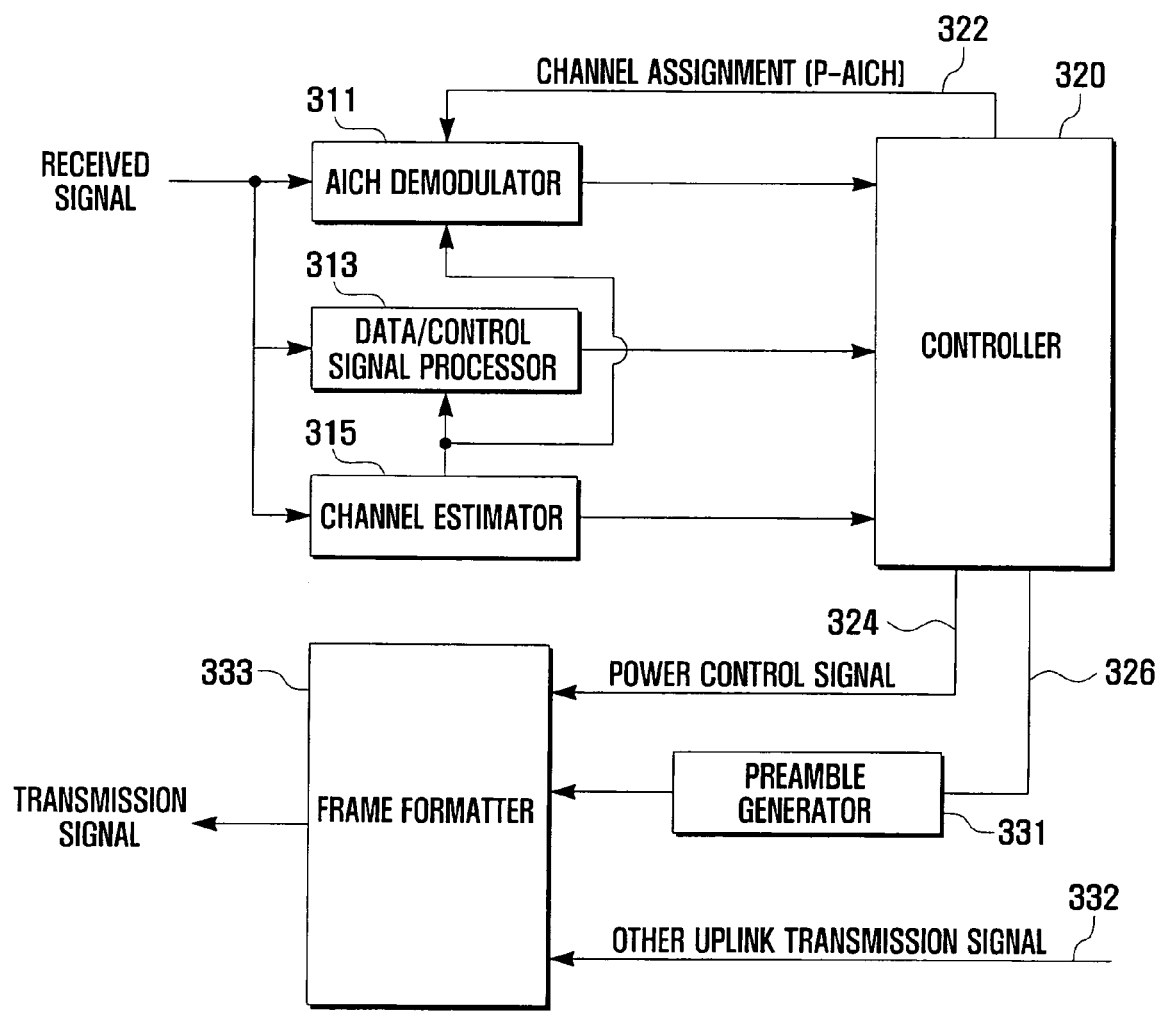
FIG. 3 is a block diagram illustrating a configuration of a user equipment (UE) employing a preamble transmission method according to an embodiment of the present invention.

FIG. 3 is a block diagram illustrating a configuration of a UE employing a preamble transmission method according to an embodiment of the present invention.

Referring to FIG. 3, the UE includes an AICH demodulator 311, a data/control signal processor 313, a channel estimator 315, a controller 320, a preamble generator 331, and a frame formatter 333.

The AICH demodulator 311 demodulates the signals transmitted by the UTRAN through the AICH on the basis of a channel assignment message 332 provided by the controller 320.

The data/control signal processor 313 processes the data and control signals received through the channels assigned by the control unit 320. The control signal includes the transmission power control command.

The channel estimator 315 estimates signal power of the signal transmitted by the UTRAN so as to allow the data/control signal processor to perform phase compensation, gain control, and demodulation. The channel estimator 315 measures the CPICH_RSCP value during a predetermined time when starting preamble transmission.

The controller 320 controls general operations of a downlink channel receiver and an uplink channel transmitter. The controller 320 generates the preamble generation control signal 326 such that the preamble generator 331 generates the preamble when the UE is required to access to the UTRAN. The controller also generates power control signal 324 for controlling the uplink transmission power. The controller 320 also processes the AICH signals received from the UTRAN. That is, the controller 320 controls the preamble generator 331 to generate the preamble and controls the AICH demodulator 311 to process the AICH signals.

The preamble generator 331 generates the preamble under the control of the controller 320.

The frame formatter 333 transmits the preamble generated by the preamble generator 331 to the UTRAN. The frame formatter 333 also controls the transmission power of the uplink on the basis of the power control signal generated by the controller. The frame formatter 333 is configured, after the UE is assigned the RACH, to transmit other signals such as power control preamble and data to the UTRAN. The power control command for downlink power control can be transmitted from the UE to the UTRAN.

FIG. 4 is a flowchart illustrating a preamble transmission method according to an exemplary embodiment of the present invention.

Referring to FIG. 4, the UE monitors a preamble transmission cycle and detects whether a preamble to be transmitted (S401). If a preamble is detected, the UE determines whether the preamble is an initial preamble or a retransmission preamble (S403). If the preamble is an initial preamble, the UE determines a CPICH_RSCP value (S405).

The CPICH_RSCP value is determined by (1) comparing n previously measured CPICH_RSCP values measured and selecting the least value. The CPICH_RSCP value also can be obtained by (2) compensating the current value in consideration of the variation of the channel status using equation 4. The UE can be configured to determine the CPICH_RSCP value obtained by (1) or (2), according to the channel environment.

Once the CPICH_RSCP value is selected, the UE calculates the initial preamble transmission power (Preamble_Initial_Power) by applying the selected CPICH_RSCP value to equation 3 (S407) and transmits the preamble to the UTRAN with the Preamble_Initial_Power (S409).

Next, the UE determines whether an Ack is received in response to the preamble (S411). If an Ack is received within a predetermined time, the UE starts transmitting/receiving data (S413). If no Ack is received, the UE determines whether a timeout counter has expired (S415). If no Ack is received before the timeout counter has expired, the UE attempts retransmission of the preamble until it is successful as many times as the preambleRetransMax (S417). Whenever retransmitting the preamble, the UE measures the CPICH_RSCP value (S419) and selects a CPICH_RSCP having the least value (S421). For example, the UE compares n CPICH_RSCP values with each other and selects the minimum CPICH_RSCP value.

Once the CPICH_RSCP value is selected, the UE calculates the Preamble_Initial_Power using the selected CPICH_RSCP value. The Preamble_Initial_Power is calculated by applying the selected CPICH_RSCP value to equation 3. Consequently, the UE transmits the preamble with the Preamble_Initial_Power. Next, the UE repeats step S411.

Returning to step S403, if the preamble is a retransmission preamble, the UE attempts retransmission as many times as the preambleRetransMax of the preamble until it is successful (S417).

As described above, the fast session establishment method and system of the present invention allow a mobile terminal to maintain a table registering parameter sets matched with the phone numbers of mobile terminals with which OLC setup have been successful such that when the mobile terminal attempts OLC setup with the corresponding parameter set, it thereby avoiding OLC parameter collision with the known terminals.

As described above, the preamble transmission method of the present invention is advantageous in terms of improving the successful RACH preamble transmission probability.

Also, the preamble transmission method of the present invention reduces a number of preamble retransmission times by estimating preamble transmission power accurately, thereby reducing unnecessary power consumption.

Further, the preamble transmission method of the present invention calculates preamble transmission power in consideration of a variation of the channel environment, whereby the preamble is transmitted with a relatively accurate transmission power, resulting in increased probability of successful transmission.

Since the preamble transmission power is calculated by reflecting the time-varying wireless channel environment, relatively accurate transmission power can be obtained and thus the retransmission time is reduced, thereby conserving battery power and improving service reliability.

While exemplary embodiments of the present invention have been illustrated and described in this specification, it will be understood by those skilled in the art that various changes or modifications of these embodiments are possible without departing from the spirit and scope of the present invention as defined by the appended claims.

What is claimed is:

1. A preamble transmission method for a wireless communication system, comprising:
   calculating an initial transmission power;
   transmitting a preamble with the initial transmission power through a random access channel;
   if an acknowledgement is received in response to the transmitted preamble, starting transmission of data;
   if no acknowledgement is received in response to the preamble, performing—
   calculating a retransmission power; and
   transmitting the preamble with the calculated retransmission power,
   wherein calculating an initial transmission power further comprises:
   measuring a received signal strength on a common pilot channel in a preamble transmission cycle;
   selecting a received signal strength having a least value; and
   calculating the initial transmission power using the received signal strength.

2. The method of claim 1, wherein measuring the received signal strength is calculated by a user equipment.

3. A preamble transmission method for a wireless communication system, comprising:
   calculating an initial transmission power;
   transmitting a preamble with the initial transmission power through a random access channel;
   if an acknowledgement is received in response to the transmitted preamble, starting transmission of data;
   if no acknowledgement is received in response to the preamble, performing—
   calculating a retransmission power; and
   transmitting the preamble with the calculated retransmission power,
   wherein calculating the initial transmission power further comprises:
   calculating a compensation value reflecting variation of a channel environment; and
   compensating the received signal strength using the calculated compensation value.

4. The method of claim 3, wherein compensating the received signal strength further comprises subtracting the calculated compensation value from the measured received signal strength.

5. A preamble transmission method for a wireless communication system, comprising:
  calculating an initial transmission power;
  transmitting a preamble with the initial transmission power through a random access channel;
  if an acknowledgement is received in response to the transmitted preamble, starting transmission of data;
  if no acknowledgement is received in response to the preamble, performing—
  calculating a retransmission power; and
  transmitting the preamble with the calculated retransmission power,
  wherein calculating the initial transmission power further comprises:
  selecting a least value among received signal strengths measured in a preamble transmission cycle;
  calculating a compensation value reflecting a variation of a channel environment; and
  calculating the initial transmission power using at least one of the selected least value and the calculated compensation value.

6. The method of claim 5, wherein calculating the retransmission power further comprises:
  measuring a received signal strength on a common pilot channel in a preamble transmission cycle;
  selecting a received signal strength having a minimum value; and
  calculating the initial transmission power using the selected minimum received signal strength.

7. A preamble transmission method for a wireless communication system including at least one radio access network allowing network access of at least one user equipment, comprising:
  estimating, at the user equipment, a received signal strength of a common pilot channel;
  calculating a transmission power using the estimated received signal strength;
  transmitting a preamble to the network with the calculated transmission power;
  if no acknowledgement is received in response to the preamble—
    retransmitting the preamble as many as a maximum retransmission times while measuring at least one received signal strength;
    recalculating the transmission power using the at least one received signal strength measured while retransmitting the preamble; and
    retransmitting the preamble with the recalculated transmission power.

8. The method of claim 7, wherein estimating the received signal strength further comprises:
  measuring at least one received signal strength of the common pilot channel in a predetermined period; and
  selecting one of the at least one received signal strength having a minimum value.

9. The method of claim 7, wherein estimating the received signal strength further comprises: calculating a compensation value reflecting variation of channel environment; and compensating a current received signal strength using the calculated compensation value.

10. The method of claim 7, wherein estimating the received signal strength further comprises:
  selecting one of the measured at least one received signal strength, having a minimum value;
  calculating a compensation value reflecting variation of a channel environment; and
  calculating the transmission power using at least one of the selected measured at least one received signal strength having a minimum value and the calculated compensation value.

11. A preamble transmission method for a wireless communication system including at least one radio access network supporting communications of user equipments located in a radio coverage of the network, comprising:
  measuring received signal strength of a common pilot channel transmitted by the network;
  calculating a transmission power of a preamble using the measured received signal strength and information on a random access channel transmitted by the network;
  estimating an optimal received signal strength for retransmission of the preamble using the calculated transmission power of a preamble;
  determining a retransmission power of the preamble using the optimal received signal strength and the information on the random access channel transmitted by the network.

12. The method of claim 11, wherein the transmission power is calculated by equation:

$$Preamble\_Initial_{13} \ Power = Primary\_CPICH\_Tx\_Power - CPICH\_RSCP + UL\_Interference + Constant\_Value$$

where the Primary_CPICH_Tx_Power is the transmission power of the common pilot channel, the CPICH_RSCP is the received signal strength, and the UL_interference is an uplink interference.

13. The method of, claim 12, wherein the CPICH_RSCP is a CPICH_RSCP having a minimum value among at least one CPICH_RSCP measured during a predetermined period.

14. The method of claim 12, wherein the CPICH_RSCP is calculated by compensating a current CPICH_RSCP using a compensation value reflecting variation of wireless channel status.

15. The method of claim 14, wherein the CPICH_RSCP is calculated by subtracting the compensation value from the current CPICH_RSCP.

16. The method of claim 12, wherein the CPICH_RSCP obtained by one of (1) selecting a CPICH_RSCP having a minimum value among at least one CPICH_RSCP measured during a predetermined period and (2) by compensating a current CPICH_RSCP using a compensation value reflecting variation of wireless channel status.

17. The method of claim 12, wherein the CPICH_RSCP obtained by measuring at least one CPICH_RSCP while transmitting the preamble as many times as a maximum number of retransmission times and selecting a CPICH_RSCP having a minimum value among the at least one measured CPICH_RSCP.

* * * * *